United States Patent [19]

Heimgartner et al.

[11] 4,353,118
[45] Oct. 5, 1982

[54] APPARATUS FOR DETERMINING THE THROUGHFLOW IN PIPE CONDUITS

[75] Inventors: Hans Heimgartner, Jona; Karl Wirz, Meilen, both of Switzerland

[73] Assignee: Häny & Cie AG, Meilen, Switzerland

[21] Appl. No.: 168,061

[22] Filed: Jul. 14, 1980

[30] Foreign Application Priority Data

Aug. 3, 1979 [CH] Switzerland .......................... 7131/79

[51] Int. Cl.³ .............................................. G01F 7/00
[52] U.S. Cl. ...................................... 364/510; 73/861; 340/606
[58] Field of Search ............... 364/509, 510, 468, 476, 364/554, 558, 575, 422; 235/92 FL; 73/861, 195, 198; 340/603, 606, 611, 626

[56] References Cited

U.S. PATENT DOCUMENTS

| | | | |
|---|---|---|---|
| Re. 29,868 | 12/1978 | Schontzler et al. | 364/510 |
| 3,866,028 | 2/1975 | Schontzler et al. | 364/510 |
| 3,929,017 | 12/1975 | Kowalski | 364/510 |
| 4,043,195 | 8/1977 | Hunting | 364/510 |
| 4,221,127 | 9/1980 | McClure | 364/510 |

Primary Examiner—Errol A. Krass
Attorney, Agent, or Firm—Werner W. Kleeman

[57] ABSTRACT

Analogue measuring value signals, generated in a throughflow measuring device, are infed to a computer by means of an analogue-digital converter. The computer adds the received digital signals and produces at regular time intervals, for instance every three seconds, an output signal corresponding to the total conveyed quantity. This output signal serves to control a display device and a printer. In the display device there is displayed the total quantity of the conveyed material during a certain time span. On the other hand, the computer forms a mean or average value signal from digital signals received within a predetermined time span, for instance likewise every three seconds. This mean value signal is characteristic for the momentary throughflow of the material during this time period. This mean or average value signal likewise serves to control the display device and the printer. In the display device there is thus also displayed the momentary throughflow quantity. Due to this processing of the measuring value signals by the computer it is also possible to obtain a correct determination of the conveyed quantity of material even if the conveyed material or medium flows through the pipe conduit or line with markedly fluctuating throughflow velocity.

17 Claims, 3 Drawing Figures

APPARATUS FOR DETERMINING THE THROUGHFLOW IN PIPE CONDUITS

BACKGROUND OF THE INVENTION

The present invention relates to a new and improved construction of apparatus for the determination of the throughflow or throughput of a medium or material which is conveyed through at least one pipe conduit or line by a pump device at a varying flow velocity, and furthermore, the invention pertains to use of this novel apparatus during the injection of such medium in construction or building applications, in order to measure the injection pressure and the quantity of injected material.

Generally speaking, the apparatus of the present development is of the type comprising a throughflow measuring device generating measuring value signals in accordance with the material throughflow. Connected with the throughflow measuring device is an evaluation device for processing the measuring value signals, and at the evaluation device there is performed, based upon these measuring value signals, a display and/or recording of the quantity of material which has been conveyed per unit of time and in toto through the pipe conduit or the like.

In Swiss Pat. No. 609,423 there is disclosed an apparatus for the injection of an injection material into a number of bore holes, wherein a throughflow device and a pressure measuring device are operatively associated with the infeed line for each bore hole. These measuring devices are connected with an evaluation device where there is displayed and/or recorded the injection pressures and the injected quantity of the medium or material being handled. Since the pump device, which consists of piston pumps, conveys the injection material through the conduits or lines with appreciable fluctuations in the throughflow velocity, considerable difficulties arise during the determination of the material throughflow, so that there is not readily possible an exact determination of the quantity of medium which is actually injected into the individual bore holes.

SUMMARY OF THE INVENTION

Therefore, with the foregoing in mind it is a primary object of the present invention to provide a new and improved construction of apparatus for determining the throughflow of materials in pipe conduits or the like, in a manner not afflicted with the aforementioned drawbacks and limitations of the prior art constructions.

Another and more specific object of the present invention aims at providing an apparatus of the previously mentioned type which enables, even in the presence of markedly fluctuating throughput of the conveyed material, an exact determination of the quantity of material or medium which is conveyed through the pipe conduit or the like.

Yet a further significant object of the present invention is directed to a new and improved construction of apparatus for reliably determining the throughflow quantity of materials which are conveyed through a suitable conveying element, such as typically a pipe conduit, in an extremely accurate and simple manner, even if there prevail appreciable fluctuations in the throughput velocity of the material.

Now in order to implement these and still further objects of the invention, which will become more readily apparent as the description proceeds, the inventive apparatus for the determination of the throughflow of a medium conveyed through at least one pipe conduit or line, by means of a pump device, with variable flow velocity, is manifested by the features that the evaluation device contains a computer which adds the received measuring value signals and produces at certain time intervals, based upon such signal addition, first output signals corresponding to the relevant total quantity of conveyed material. In each successive time periods there is generated second output signals by carrying out a mean or average value formation of the measuring value signals obtained in a time period. These second output signals are characteristic of the related throughflow of the material in the corresponding time period, and the first and second output signals serve to control a display device and/or recording device.

The measuring value signals, corresponding to the momentary throughflow, and infed in a rapid sequence to the computer are processed in such computer, in order to obtain output signals for controlling the display device and/or recording device. Since the latter, in the presence of rapidly altering material throughflow, are not able to follow these changes free of inertia, there are produced in the computer during given constant time spans output signals for the display and/or recording of the relevant momentary throughflow. These output signals correspond to a mean or average value of the measuring value signals which have been received during such time spans. Thus, it is possible to display and/or record the material throughflow with satisfactory accuracy. However, for the determination of the total quantity there is accomplished, in contrast thereto, in the computer a continuous summation of the obtained measuring value signals. For the display of such total quantity the computer produces at certain time intervals, which preferably coincide with the time spans of the aforementioned mean value formation, output signals initiating a display and/or recording of the relevant total quantity. During the display and/or recording periods there is continued the addition of the measuring value signals, so that the total quantity can be determined exactly at any point in time.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
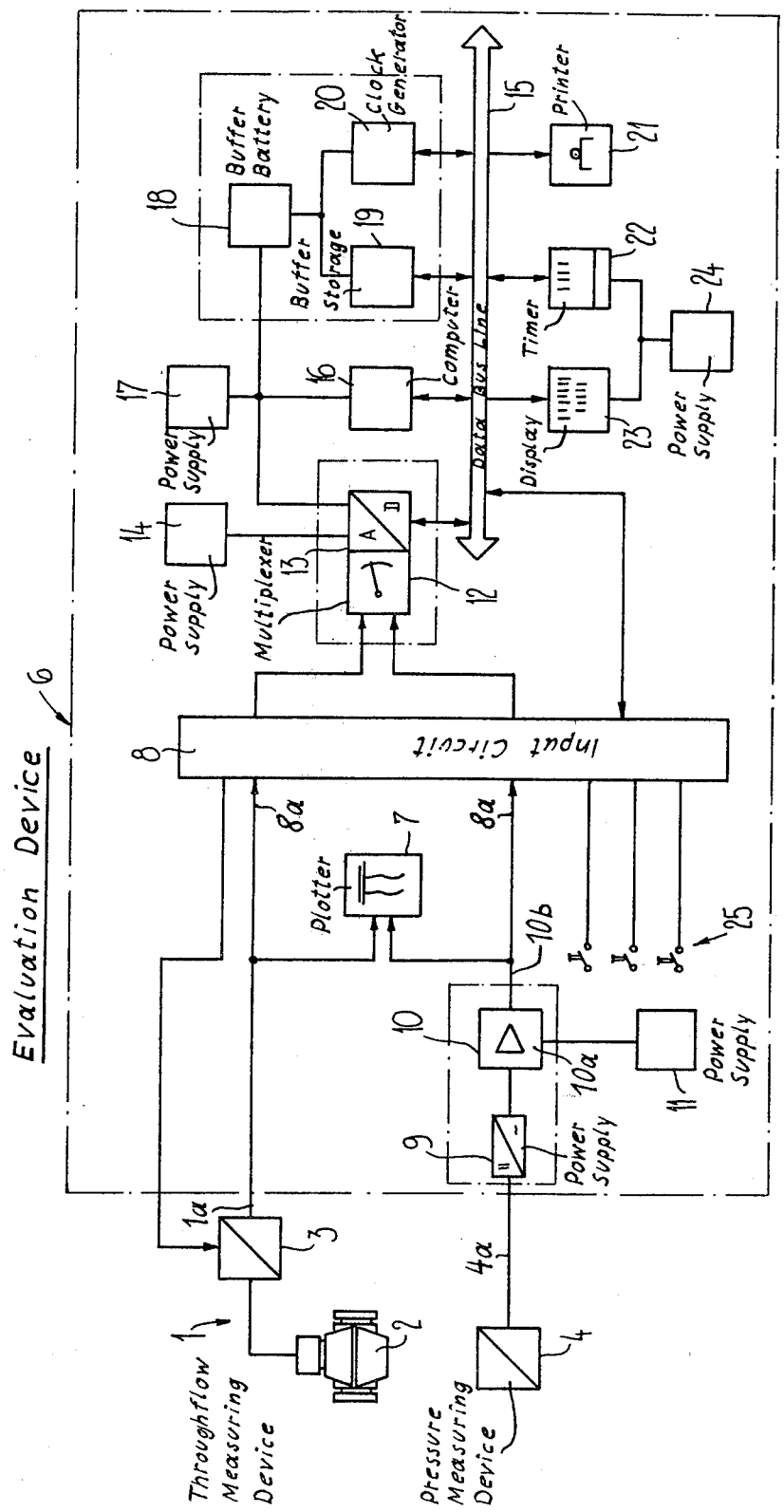
FIG. 1 is a block circuit diagram of an apparatus for the display and recording or plotting of the throughflow of a medium conveyed through a pipe conduit or line.
Figure 2:
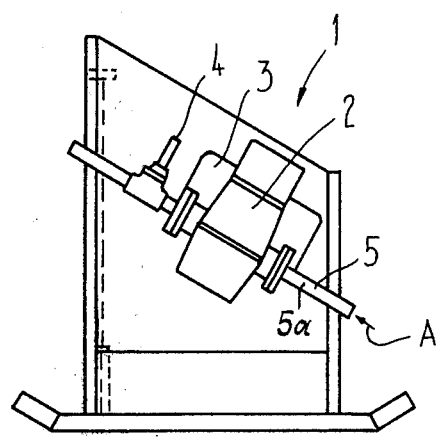
FIG. 2 is a schematic side view of a pipe conduit section containing a throughflow device and pressure measuring device.

Describing now the drawings, in FIG. 1 there is shown in block circuit diagram an exemplary embodiment of apparatus enabling a display and recording or plotting of the throughflow or throughput and the pressure of an injection medium. This injection medium or material is conveyed to a bore hole in not particularly illustrated but conventional manner by means of a piston pump, from a preparatory container or vessel through a pipe conduit or line 5, as shown in FIG. 2. In order to measure the throughflow and the pressure there is provided a standard material throughflow measuring device 1 which contains an inductive measuring value transmitter 2 and a measuring transducer or converter 3 as well as a standard pressure measuring device 4. As best seen by referring to FIG. 2, both the throughflow measuring device 1 and the pressure measuring device 4 are arranged in an ascending portion or section 5a of the pipe conduit or line 5. This pipe section 5a of the pipe conduit 5, equipped with both of the measuring device 1 and 4, ascends in the throughput or throughflow direction A of the medium. In this way there is achieved the result that this pipe conduit section 5a always is filled, thereby preventing any falsification of the measurement. Additionally, this inclined positioning of the pipe conduit section 5a allows for faultless cleaning thereof. The throughflow measuring device 1 and the pressure measuring device 4 generate analogue measuring value signals which are proportional to the medium throughflow and the pressure, respectively.

Both of the measuring devices 1 and 4 are connected by means of the signal lines or conductors 1a and 4a with an evaluation device or station 6. The output signals of the measuring transducer 3 are infed, on the one hand, to a recording device or plotter 7, which in the embodiment under discussion is a line recorder, as well as to an input circuit 8 which undertakes signal adaptation. The inputs 8a of this input circuit 8 are galvanically separated from one another by conventional optocouplers or equivalent structure. The pressure measuring device 4 is connected with a power supply device 9, arranged in the evaluation station or device 6, serving for a two-line converter, which is required because for the pressure measurement there is utilized a two-wire or conductor system. The measuring value signals, generated by the pressure measuring device 4, are infed to a measuring amplifier 10 containing a standard sample-and-hold circuit, generally indicated by reference character 10a. This measuring amplifier 10 is connected with a power supply device 11. There is assigned to the sample-and-hold circuit 10a the task of only further conducting the measuring value signals corresponding to the maximum pressure value, since only the maximum pressures are recorded. If, however, there is desired recordal of the entire pressure course, then this sample-and-hold circuit 10a can be disconnected. The analogue signals appearing at the output 10b of the measuring amplifier 10 are infed, on the one hand, to the recording device 7 and, on the other hand, to the input circuit 8. The recording device 7 thus plots the material throughflow and the pressure course.

The analogue signals arrive from the input circuit 8 by means of a multiplex circuit or multiplexer 12 at an analogue-digital converter 13 which converts the analogue measuring value signals into digital signals. The converter 13 is connected, on the one hand, with a power supply device or unit 14 and, on the other hand, with a data bus line or busbar 15. Also connected with the data bus line or busbar 15 is a computer 16 (central processing unit CPU) which, in a manner to be more fully described hereinafter, processes the digital signals obtained from the analogue-digital converter 13. This computer 16 is connected along with the analogue-digital converter 13 to a further power supply device or unit 17. Additionally, there is provided a buffer battery 18 or equivalent structure which is connected with the analogue-digital converter 13, the computer 16 and with a buffer storage 19 and a clock generator 20. The buffer battery 18 serves to maintain the current supply even in the event of power failure at the network and upon disconnection of the evaluation device or station 6 from the power supply network. At the buffer storage 19, connected with the data bus line 15, there is undertaken a storage of the time of day, also referred to simply as the clock time or time, which is formed in a manner still to be described, as well as the signals generated by the computer 16 and corresponding to the total conveyed quantity of the medium or material. The data stored in the buffer storage 19, in the event of power failure of the current supply or upon disconnect of the evaluation device 6 from the power supply network, remains stored for a certain amount of time. The clock generator 20 produces clock signals for the different components of the system, especially for controlling the course of the program which is fixed by the computer 16.

Additionally, there is connected with the data bus line or busbar 15 a printer 21, a timing device 22 and a throughflow and total quantity display or indicator 23. The timer or timing unit 22 and the display device 23 are connected with a power supply device 24.

In the timing unit 22, which receives clock signals from the clock generator 20, there is determined the time and the date (day and year). Depending upon the selected system operation there is accomplished a display of the time of the day or the date. With this timing unit 22 it is additionally possible to set the print-out intervals of the printer 21 or equivalent structure. By means of a not particularly illustrated time setting element it is possible to set at the timing unit or timer 22 the time intervals during which the printer 21 should print-out the data. The printer 21 prints, among other things, the date, the time, the momentary throughflow quantity, the momentary total quantity and the magnitude of the pressure. In the display device or unit 23 there is displayed the momentary throughflow quantity and the total quantity.

Having now had the benefit of the foregoing discussion of the apparatus for the determination of the throughflow of a material or medium conveyed with variable velocity through at least one pipe conduit or the like, there will be explained the mode of operation of the apparatus based upon the showing of FIGS. 1 and 2, to the extent that such is not already evident from the previous description.

The analogue measuring value signal, generated by the throughflow measuring device 1 and the pressure measuring device 4, serve on the one hand for controlling the recording device 7 and, on the other hand, are infed by means of the input circuit 8, the multiplexer 12 and the analogue-digital converter 13 to the computer 16. The digital signals, corresponding to the measuring value signals of the pressure measuring device 4, are prepared at the computer 16 for controlling the printer 21. The digital signals corresponding to the output signals of the throughflow measuring device 1, are processed, on the one hand, in the computer 16 to form from the total quantity corresponding output signals, and, on the other hand, for forming from the momentary throughput or throughflow corresponding output signals. In order to produce the first-mentioned output signals the computer 16 adds the digital signals which arrive at short time intervals, for instance every 20 ms and produces at given time intervals, for instance every three seconds, an output signal which is characteristic for the total quantity conveyed up to this point in time. This output signal serves for controlling the display device or unit 23 for the purpose of displaying such total quantity. On the other hand, this output signal additionally serves to control the printer 21.

Now in order to produce output signals which correspond to the momentary throughput quantities, the computer 16 forms within each uniform, successive time period, for instance of three seconds, based upon the digital signals received within one time period, a mean or average value signal. This mean or average value signal is infed as an output signal to the display device 23 and, if desired, also to the printer 21. In the event that within one time period the mean or average value of the throughflow, determined in the aforedescribed manner, has altered in relation to the corresponding mean or average value of the preceding time period, then this second output signal causes the computer 16 to perform a corresponding change in the display of the throughflow quantity at the display device 23.

Within the previously mentioned pre-selected time intervals the printer 21 prints-out the momentarily relevant data.

It is possible to act upon this previously described program course by actuating appropriate actuation elements 25, which are provided at the evaluation station or device 6. As to such possibility of influencing the course of the program reference will again be made thereto with respect to the description of FIG. 3 given hereinafter.

With the exemplary embodiment under discussion the throughflow measuring device 1 is provided with two different, switchable measuring ranges. Based upon the mean or average value of the throughflow, determined by the computer 16, this computer 16 causes switching of the throughflow measuring device 1 to that measuring range corresponding to the momentary medium throughflow. In the event that a number of bore holes are to be supplied with injection material by means of, in each case, pipe conduits or lines which are parallelly fed by the pump device, then for measuring the throughflow and the pressure in each of these pipe conduits there can be incorporated a respective throughflow measuring device 1 and a pressure measuring device 4. All of these measuring devices 1 and 4 are connected to a common evaluation device or station 6, the construction and mode of operation of which essentially corresponds to the evaluation station or device 6 of FIG. 1. Based upon the illustration of FIG. 3 there will now be explained such type evaluation station. In contrast to the embodiment illustrated in FIG. 1, there is however provided for each pipe conduit a display device 23 for the display of the total quantity and the relevant momentary medium throughflow. Additionally, there is also provided a display device for displaying the total quantity of the medium which is conveyed collectively through all of the pipe conduits or lines. It should be understood that the computer 16 which controls the display devices 23 and also the printer 21 must be constructed in accordance with the program. In this case the printer 21 prints out the data (pressure, throughflow quantity) for each of these pipe conduits.

Instead of, as previously explained, arranging in each pipe line or conduit a throughflow measuring device 1 and a pressure measuring device 4, it is also possible to provide a measuring conduit or line with a throughflow measuring device 1 and a pressure measuring device 4. This measuring line is now selectively connected and in succession, by means of switching valves, with the individual pipe conduits extending from the pump device to the bore holes, so that the injection material flows into a pipe conduit through the measuring line or conduit. In this case, the evaluation device 6 is similarly constructed as the previously described evaluation device, i.e. likewise equipped with a number of display devices 23. Of course, the computer 16 must be correspondingly constructed, since the measuring value signals correlated with the individual pipe conduits or lines, in contrast to the previously discussed case, do not appear in parallel but in succession.

Figure 3:
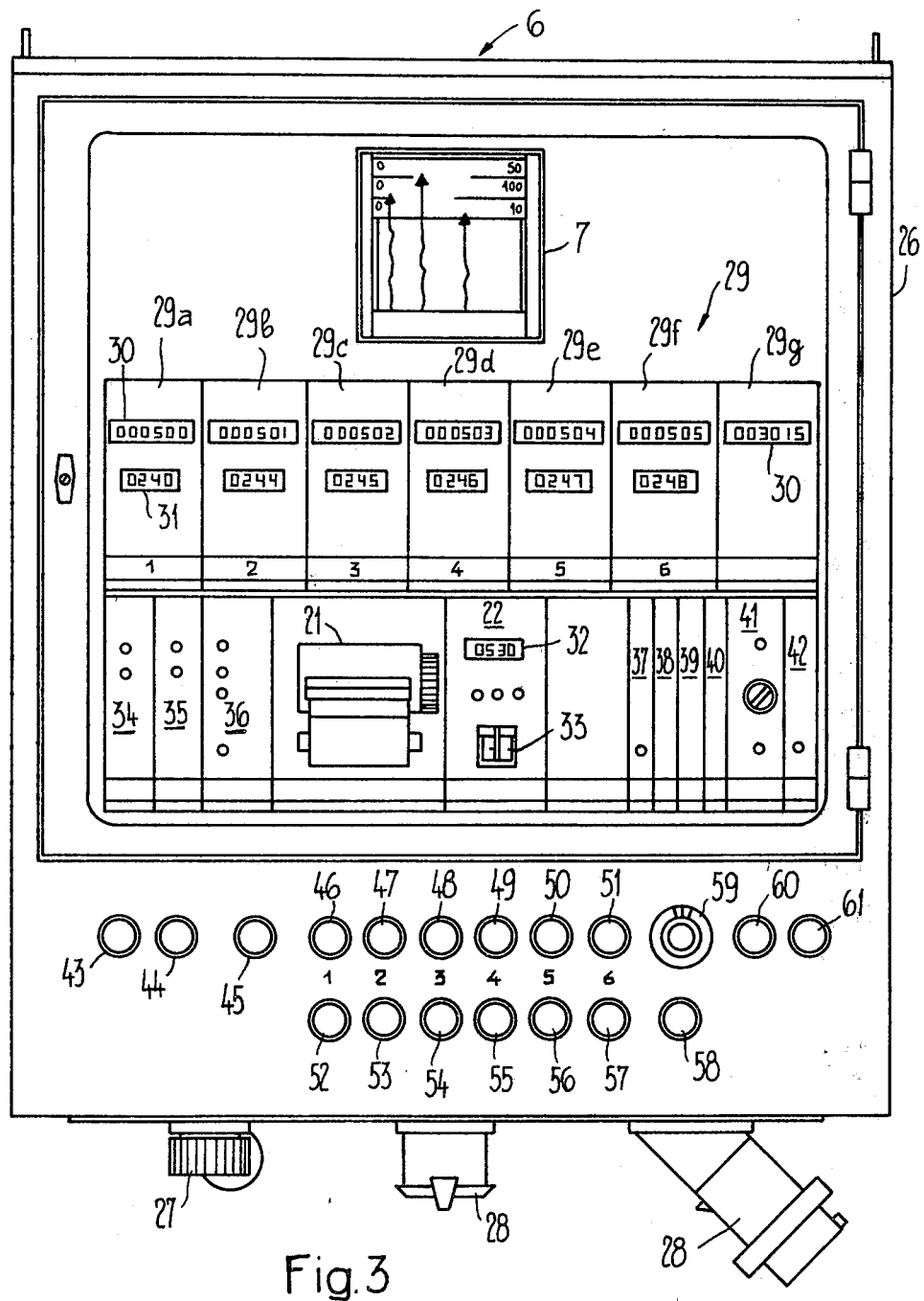
FIG. 3 schematically illustrates in front view an evaluation station of an apparatus for the display and recording of the throughflow of a medium conveyed through six parallelly fed pipe conduits or lines.

Now in FIG. 3 there is shown in front view an evaluation device 6 for an apparatus for displaying and recording the throughflow or throughput through six parallelly fed pipe conduits or lines. In FIG. 3 there have been conveniently designated the same or analogous components by the same reference characters as used with the embodiment of FIG. 1. The evaluation device or station 6 contains a housing 26 where there are housed the components thereof. This housing 26 possesses a socket 27 for the signal cable leading to the throughflow measuring device 1 and the pressure measuring device 4, as well as two network connection sockets 28. The recording device or plotter 7 possesses 7 three tracks, one of which serves for recording the pressure and both of the others of which serve for plotting the throughflow quantity, and depending upon the set measuring range there is accomplished at the one or the other track a recording or plotting operation. Below the recording device 7 there is arranged the display section or device 29 for the display of the momentary throughflow and the total quantity. This display device 29 contains seven adjacently arranged display units 29a to 29g, wherein the units 29a to 29f are operatively arranged in each case with one of the pipe conduits or lines 1 to 6, respectively, whereas the remaining display unit 29g serves for the display of the total quantity of medium which is conveyed through all of the pipe conduits or lines. Each display unit 29a to 29g is accordingly provided with a total quantity display or indicator 30, whereas the display units 29a to 29f additionally are provided with a throughflow quantity display or indicator 31. Below the display device 29 there is arranged the printer 21 and the timing unit 22. The latter comprises a display field 32 where there is displayed, as already mentioned, according to selection the time or the date. By means of the time selector element 33 it is possible to set the time interval between two print-outs of the printer 21. Laterally of the printer 21 and the timing unit or timer 22 there are arranged different draws or slide-in chassis or trays 34 to 42 or equivalent structure. In the slide-in chassis 34 there are housed the power supply units 17 and 24 and in the slide-in chassis 35 the power supply unit 14. The slide-in chassis 36 contains the power supply unit or device 9, the measuring amplifier 10 and the power supply unit 11. The slide-in chassis 37 accommodates the input circuit 8, the slide-in chassis 38 an output circuit, the slide-in chassis 39 a voltage converter and the slide-in chassis 40 the analogue-digital converter 13. Within the slide-in chassis 41 there is housed the buffer battery 18 and the buffer storage 19, whereas in the slide-in chassis 42 there is housed the computer or computer device 16.

At the lower portion of the evaluation station or device 6 there are arranged different actuation switches, of which the switch 43 serves for connecting the evaluation station or device 6 with the power supply network, the switch 44 for turning-on the equipment lighting or illumination and the switch 45 for starting the measuring operation. If the equipment is connected with the power supply network by actuating the switch 43, then it is thereafter necessary to wait for about, for instance, ten minutes before performing the measurements during a so-called warm-up time of the equipment. In the display field or zone 31 of the display unit 29a there is displayed the momentary waiting time before which the equipment can be put into use. When there is displayed the value null then, by actuating the switch 45, it is possible to begin with the measurements. By actuating the individual bore hole-selector switches 46 to 51 it is possible to select the individual bore holes or pipe conduits at which there is carried out the measurement. By means of the keys or buttons 52 to 58 or equivalent structure there can be reset the individual display units 29a to 29g. By actuating the switches 52 to 58 the displays 30, 31 are reset to null, and during such resetting there can be printed-out the counter states while indicating the time and the date by the printer 21. In this way there can be precluded an unintentional or, in fact, intentional eradication of the data. By means of the rotary switch 59 the recording device 7 is switched to one of the pipe conduits or lines, in order to record the medium throughflow and the pressure in such selected pipe conduit. By means of the switch 60 it is possible to set the pressure range. If there is desired a printed-out externally of the fixedly set time interval, then it is necessary to activate the switch 61, and the printer 21 is turned-on.

It should be understood that it is possible, apart from the previously described functional operations, to also provide further functional operations.

The evaluation device 6 for the display and recording of the throughflow and the pressure within a pipe conduit or line, as the same has been illustrated in FIG. 1, appears in front view similar to the station shown in FIG. 3, and of course the display section or device 29 contains only one display unit and the number of switches 43 to 61 is correspondingly less.

By virtue of the described manner of signal processing in the computer 16 there is obtained the beneficial result that it is possible to display and/or record both the total quantity and also the momentary throughflow quantity even then in a faultless manner if, by virtue of the use of piston pumps, both the pressure in the pipe conduits and also the throughflow velocity and thus the throughflow quantity alters extremely rapidly and quite intensively.

Although the previously described apparatus is especially suitable for displaying and recording the quantity and the pressure of material injected during injection operations in the construction industry or the like, the inventive equipment also can be employed in all those instances where there should be determined the throughflow and, if desired, additionally also the pressure of a medium flowing through a pipe conduit or line, the medium being conveyed through such pipe conduit with markedly fluctuating velocity, as such would be the case when using piston pumps.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for determining the rate of flow of a medium conveyed with varying velocity through at least one pipe conduit by means of a pump device, comprising:
    a flow rate measuring device arranged in the pipe conduit and generating measuring value signals corresponding to the rate of flow of the medium through the pipe conduit;
    an evaluation device connected to the flow rate measuring device for processing the measuring value signals; and
    means for the indication of the quantity of medium conveyed through the pipe conduit both as a function of time and the total quantity of medium;
    said evaluation device containing a computer for adding the received measuring value signals and generating at certain time intervals, based upon the addition of such received measuring value signals, first output signals corresponding to the total quantity of conveyed medium and generating in each of successive time periods second output signals by forming a mean value based upon the measuring value signals received during a given time period;
    said second output signals being characteristic of the momentary rate of flow of the medium during said given time period; and
    said first and second output signals serving to control said indication means.

2. The apparatus as defined in claim 1, wherein:
    said indication means is a visual display.

3. The apparatus as defined in claim 1, wherein:
    said indication means serves for at least plotting the quantity of medium conveyed per unit of time through said pipe conduit and the total quantity of medium conveyed through said pipe conduit.

4. The apparatus as defined in claim 1, wherein:
    said flow rate measuring device comprises an inductive flow rate measuring device; and
    an analogue-digital converter connected in circuit between said flow rate measuring device and said 5. The apparatus as defined in claim 4, wherein:
    said flow rate measuring device is provided with different measuring ranges; and
    said computer initiates a switching of the measuring range of said throughflow measuring device in accordance with the determined rate of flow of the medium.

6. The apparatus as defined in claim 1, further including:
    a pressure measuring device arranged in the pipe conduit for generating a measuring value signal corresponding to the pressure of the medium; and
    said pressure measuring device being connected to the evaluation device for the purpose of indicating the pressure of the medium.

7. The apparatus as defined in claim 1, wherein:
    said indication means comprises a printer for printing-out data selectively at any one of given time intervals or in accordance with an appropriate command, or both.

8. The apparatus as defined in claim 1, wherein:
    said computer simultaneously generates the first and second output signals.

9. The apparatus as defined in claim 1, wherein:

said indication means following turning-on of the evaluation device, indicates the time to wait until the apparatus can be placed into operation.

10. The apparatus as defined in claim 1, used for the determination of the rate of flow of a medium conveyed simultaneously through a number of pipe conduits wherein:
   a flow rate measuring device is arranged in each pipe conduit;
   all of said flow rate measuring devices are connected to said evaluation device which constitutes a common evaluation device;
   said indication means of said evaluation device contains a plurality of indication units each associated with a related pipe conduit for the indication of the quantity of medium conveyed per unit of time and the total quantity of medium conveyed through the related pipe conduit; and
   a display device for indicating the total quantity of medium collectively conveyed through all of the pipe conduits.

11. The apparatus as defined in claim 10, further including:
   a respective pressure measuring device arranged within each pipe conduit.

12. The apparatus as defined in claim 10, further including:
   a printer provided for said indication means for printing-out the data correlated to the individual pipe conduits.

13. The apparatus as defined in claim 1, used for the determination of the rate of flow of a medium conveyed simultaneously through a number of pipe conduits, further including:
   a measuring pipe conduit;
   said flow rate measuring device being arranged in said measuring pipe conduit;
   said measuring pipe conduit being selectively connectable with one of the pipe conduits;
   said indication means containing a plurality of indication units each of which is associated with one of the pipe conduits and serving to indicate the quantity of medium conveyed per unit of time and totally through the corresponding pipe conduits; and
   said indication means further including a display unit for indicating the total quantity of medium conveyed collectively through all of the pipe conduits.

14. The apparatus as defined in claim 13, further including:
   a pressure measuring device arranged in said measuring line.

15. The apparatus as defined in claim 13, further including:
   a printer provided for said indication means for printing-out data correlated to the individual pipe conduits.

16. The apparatus as defined in claim 1, wherein:
   the pipe conduit containing at least the throughflow measuring device has a pipe conduit section which ascends in the direction of throughflow of the medium.

17. The apparatus as defined in claim 1, wherein:
   said apparatus is used during the injection of injectable quantities of materials used in the construction industry for measuring the injection pressure and the injected quantity of the material.

* * * * *